United States Patent
Sitsky et al.

(10) Patent No.: US 10,185,717 B2
(45) Date of Patent: *Jan. 22, 2019

(54) DATA PROCESSING SYSTEM FOR PARALLELIZING ELECTRONIC DOCUMENT INDEXING

(71) Applicant: Nuix Pty Ltd, Sydney (AU)

(72) Inventors: David Sitsky, Garran (AU); Eddie Sheehy, Willoughby (AU)

(73) Assignee: Nuix Pty Ltd, Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/606,248

(22) Filed: May 26, 2017

(65) Prior Publication Data

US 2018/0004738 A1 Jan. 4, 2018

Related U.S. Application Data

(63) Continuation of application No. 13/705,522, filed on Dec. 5, 2012, now Pat. No. 9,665,573, which is a continuation of application No. 12/866,950, filed as application No. PCT/US2009/033759 on Feb. 11, 2009, now Pat. No. 8,359,365.

(60) Provisional application No. 61/027,600, filed on Feb. 11, 2008, provisional application No. 61/027,603, filed on Feb. 11, 2008.

(51) Int. Cl.
*G06F 15/16* (2006.01)
*G06F 17/30* (2006.01)
*G06F 9/50* (2006.01)

(52) U.S. Cl.
CPC ........ *G06F 17/30011* (2013.01); *G06F 9/505* (2013.01); *G06F 17/30613* (2013.01); *G06F 2209/5017* (2013.01)

(58) Field of Classification Search
CPC ......... G06F 17/30011; G06F 17/30613; G06F 9/505; G06F 2209/5017
See application file for complete search history.

(56) References Cited

U.S. PATENT DOCUMENTS 5,230,047 A 7/1993 Frey, Jr. et al.
5,590,284 A 12/1996 Crosetto
(Continued)

FOREIGN PATENT DOCUMENTS

KR 20030013619 A 2/2003
KR 20050057834 A 6/2005
(Continued)

OTHER PUBLICATIONS

International Search Report and Written Opinion dated Sep. 29, 2009, for International application No. PCT/US2009/033759 with interntional filing date Feb. 11, 2009 (8 pages).

*Primary Examiner* — Viet D Vu
(74) *Attorney, Agent, or Firm* — Brown Rudnick LLP; Mark S. Leonardo

(57) ABSTRACT

A system and method for parallelizing document indexing in a data processing system. The data processing system includes a primary processor for receiving a list of data having embedded data associated therewith, at lest one secondary processor to process the data as provided by the primary processor, a data processor to determine a characteristic of the embedded data and process the embedded data based upon the characteristic, and a messaging module to exchange at least one status message between the primary processor and the at least one secondary processor.

13 Claims, 3 Drawing Sheets

(56) References Cited

U.S. PATENT DOCUMENTS

| | | |
|---|---|---|
| 5,838,913 A | 11/1998 | Lysejko et al. |
| 5,867,649 A | 2/1999 | Larson |
| 5,963,944 A | 10/1999 | Adams |
| 5,987,468 A | 11/1999 | Singh et al. |
| 6,219,833 B1 | 4/2001 | Solomon et al. |
| 6,651,065 B2 | 11/2003 | Brown et al. |
| 6,993,763 B2 | 1/2006 | Hayes, Jr. |
| 7,162,620 B2 | 1/2007 | Magoshi |
| 7,263,536 B1 | 8/2007 | Pederson |
| 7,523,130 B1 | 4/2009 | Meadway et al. |
| 7,669,036 B2 | 2/2010 | Brown |
| 7,672,790 B2 | 3/2010 | McGraw et al. |
| 7,730,113 B1 | 6/2010 | Payette et al. |
| 7,743,189 B2 | 6/2010 | Brown et al. |
| 7,751,805 B2 | 7/2010 | Neven et al. |
| 8,239,938 B2 | 8/2012 | Simeral et al. |
| 8,359,365 B2 | 1/2013 | Sitsky et al. |
| 8,370,845 B1 | 2/2013 | Le Grand |
| 8,396,838 B2 | 3/2013 | Brockway et al. |
| 8,407,190 B2 | 3/2013 | Prahlad et al. |
| 8,429,147 B1 | 4/2013 | Dutton et al. |
| 8,429,165 B1 | 4/2013 | Jung et al. |
| 8,491,384 B2 | 7/2013 | Tran et al. |
| 8,499,025 B2 | 7/2013 | Howard |
| 8,510,237 B2 | 8/2013 | Cascaval et al. |
| 8,510,492 B2 | 8/2013 | Martchovsky |
| 8,516,174 B2 | 8/2013 | Goerlich et al. |
| 8,527,972 B2 | 9/2013 | Shimura |
| 8,531,942 B2 | 9/2013 | Buttner et al. |
| 8,533,717 B2 | 9/2013 | Kilian et al. |
| 8,555,265 B2 | 10/2013 | Chambers et al. |
| 8,819,694 B2 | 8/2014 | Corona |
| 2002/0009079 A1 | 1/2002 | Jungck et al. |
| 2002/0029207 A1 | 3/2002 | Bakalash et al. |
| 2003/0101099 A1 | 5/2003 | Sheltz et al. |
| 2003/0167295 A1 | 9/2003 | Choo |
| 2003/0182355 A1 | 9/2003 | Edahiro et al. |
| 2003/0226108 A1 | 12/2003 | Oezgen |
| 2004/0003039 A1 | 1/2004 | Humphrey et al. |
| 2004/0015978 A1 | 1/2004 | Orii |
| 2004/0111552 A1 | 6/2004 | Arimilli et al. |
| 2004/0215600 A1 | 10/2004 | Aridor et al. |
| 2005/0131893 A1 | 6/2005 | Von Glan |
| 2007/0073894 A1 | 3/2007 | Erickson et al. |
| 2008/0030764 A1 | 2/2008 | Zhu et al. |
| 2008/0059452 A1 | 3/2008 | Frank |
| 2008/0080718 A1 | 4/2008 | Meijer et al. |
| 2008/0082490 A1 | 4/2008 | MacLaurin et al. |
| 2008/0104609 A1 | 5/2008 | D'Amora et al. |
| 2008/0143707 A1 | 6/2008 | Mitchell |
| 2010/0162261 A1 | 6/2010 | Shashidhara |
| 2011/0047551 A1 | 2/2011 | Sitsky et al. |
| 2011/0274329 A1 | 11/2011 | Mathew et al. |
| 2012/0233130 A1 | 9/2012 | Vedachalam et al. |
| 2012/0265762 A1 | 10/2012 | Wade et al. |
| 2012/0296891 A1 | 11/2012 | Rangan |
| 2013/0021238 A1 | 1/2013 | Laufgraben |
| 2013/0024424 A1 | 1/2013 | Prahlad et al. |
| 2013/0028106 A1 | 1/2013 | Frost |
| 2013/0060933 A1 | 3/2013 | Tung et al. |
| 2013/0114107 A1 | 5/2013 | Park |
| 2013/0127851 A1 | 5/2013 | Richards, Jr. |
| 2013/0132468 A1 | 5/2013 | Azeez et al. |
| 2013/0173499 A1 | 7/2013 | Cannon |
| 2013/0205018 A1 | 8/2013 | Rahman et al. |
| 2013/0212090 A1 | 8/2013 | Sperling et al. |
| 2013/0231912 A1 | 9/2013 | Ye et al. |
| 2013/0237200 A1 | 9/2013 | Nystrom et al. |
| 2013/0238572 A1 | 9/2013 | Prahlad et al. |
| 2013/0325873 A1 | 12/2013 | Sitsky et al. |

FOREIGN PATENT DOCUMENTS

| | | |
|---|---|---|
| WO | 03/079206 A1 | 9/2003 |
| WO | 2009/102765 A2 | 8/2009 |

DATA PROCESSING SYSTEM FOR PARALLELIZING ELECTRONIC DOCUMENT INDEXING

CROSS-REFERENCE TO RELATED APPLICATIONS

This patent application is a continuation of U.S. patent application Ser. No. 13/705,522, filed Dec. 5, 2012, which is a continuation of U.S. patent application Ser. No. 12/866,950, filed on Nov. 5, 2010, which issued on Jan. 22, 2013 as U.S. Pat. No. 8,359,365, which is a national stage entry of PCT/US2009/033759 with an International Filing Date of Feb. 11, 2009, which claims priority to U.S. Provisional Application Nos. 61/027,600 and 61/027,603, filed in the U.S. Patent and Trademark Office (USPTO) on Feb. 11, 2008 by Sitsky et al., the entire contents of each application being incorporated herein by reference in their entirety.A1

BACKGROUND

1. Technical Field

The present disclosure generally relates to the field of electronic document indexing, and more particularly, to the parallelization of document indexing in the area of electronic discovery.

2. Description of the Related Art

Document indexing is one of the earliest phases in the electronic discovery lifecycle. It aims to identify and extract all office documents, emails, archives and other unstructured documents from the collected electronic evidence pertinent to a legal case. For each item extracted, it is necessary for searching purposes to extract all of the text contained in the item, and its metadata. This text is stored into a specialized text databases, which facilitates fast keyword searching over very large data sets. Keyword searching, in combination with other metadata specific searches, form the basis of filtering a very large data set into a more relevant subset that is then packaged for manual review or further analysis.

Document indexing of electronic data is traditionally performed on a single machine. Because electronic data is highly unstructured and hierarchal, a document indexing case could consist of a directory containing millions of office documents, a single exchange database file containing millions of email messages, or disk images of machines under investigation. For example, a zip file can contain office documents, an email message can contain attachments, an Outlook PST file can contain email messages and a disk image can contain files of any type. These drawbacks presents a problem since electronic discovery cases are growing rapidly in size, and there is a fundamental limit as to how fast a single machine can index data.

SUMMARY

According to an aspect of the present disclosure, a data processing system for parallelizing document indexing is presented. The data processing system is comprised of a primary processor, at least one secondary processor, and a messaging module. The primary processer receives a list of data, which may include embedded data therein, and creates a work item based upon the list of data. The at least one secondary processor processes the work items as provided by the primary processor. The at least one secondary processor further includes a data processor to determine a characteristic of the embedded data and process the embedded data based upon the characteristic. The messaging module of the data processing system exchanges at least one status message between the primary processor and the at least one secondary processor.

According to another aspect of the present disclosure, a method for parallelizing document indexing in a data processing system is presented. The method includes the steps of receiving a list of data having embedded data associated therewith, creating a work item based upon the list of data, exchanging at least one status message, processing the work item, determining a characteristic of the embedded data, and processing the embedded data based upon the characteristic. A work item includes the physical location of the data stored in a data storage medium, at least one data identifier to distinguish the location of the embedded data, and an identifier associated with the data. The at least one status message includes any one or more of the following: a processed work item, a processed work item related to the embedded data, a result of the processed work items, a request for the work item, the creation of a new work item, a request to process the new work item, and a notification relating to the completion of processed work items.

BRIEF DESCRIPTION OF THE DRAWINGS

The objects and features of the present disclosure, which are believed to be novel, are set forth with particularity in the appended claims. The present disclosure, both as to its organization and manner of operation, together with further objectives and advantages, may be best understood by reference to the following description, taken in connection with the accompanying drawings as set forth below:

DETAILED DESCRIPTION OF EXEMPLARY EMBODIMENTS

The present disclosure generally relates to the field of electronic document indexing, and more particularly, to the parallelization of document indexing in the area of electronic discovery.

In the discussion that follows, the term "processor" shall refer to any computer with at least one processing means. Examples of a processor may include, but are not limited to, single or multiple computers having multi-core processing means. The term "data" shall refer to any collection of numbers, characters, images, instructions, or other forms of information in an electronic format. Examples of data may include, but are not limited to, an exchangeable database file, a disk image file, electronic documents, electronic mail messages, PST files, an electronic document embedded within another file, and a directory containing millions of office documents.

Reference will now be made in detail to exemplary embodiments of the present disclosure, which are illustrated in the accompanying figures. The same reference numbers in different drawings may identify the same or similar elements. In addition, the following detailed description does not limit the present disclosure.

Figure 1:
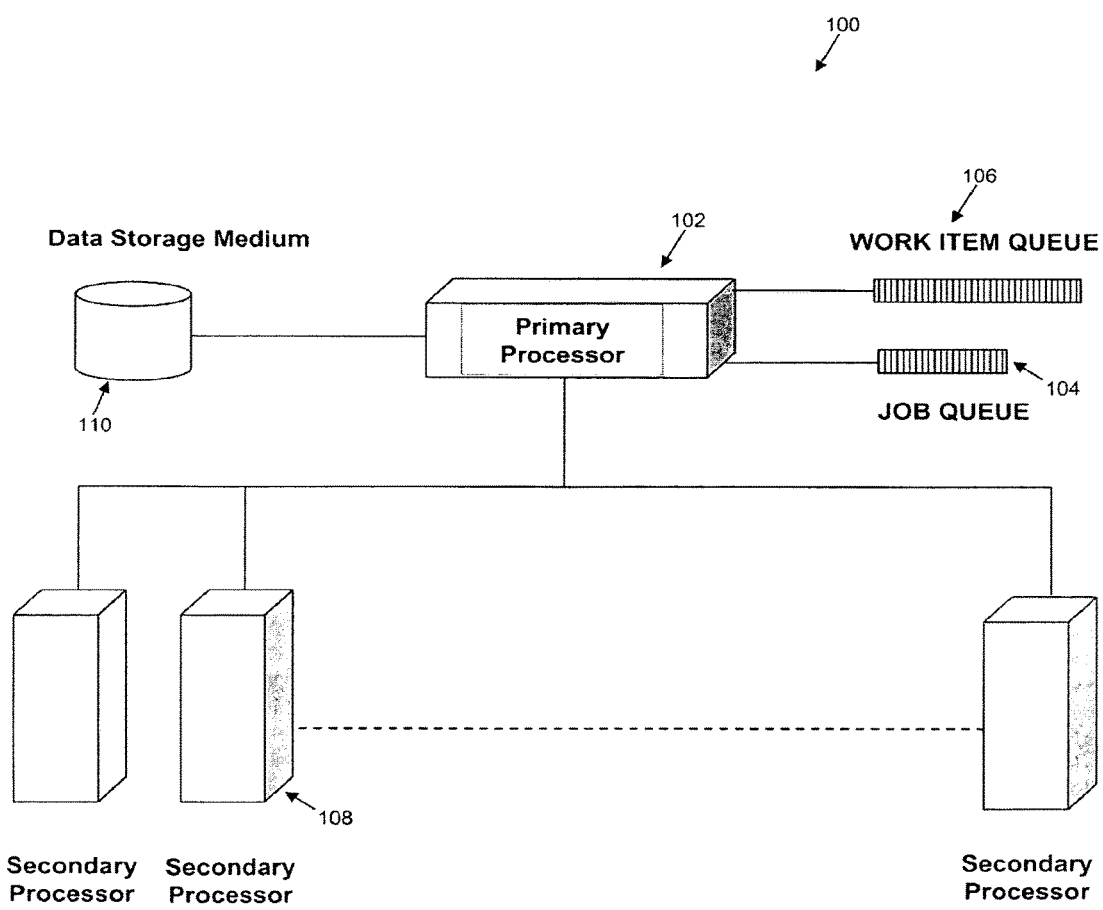
FIG. 1 is a diagram of a data processing system for parallelizing document indexing, according to the present disclosure.

Referring to FIG. 1, a data processing system 100 for parallelizing document indexing is presented. Data processing system 100 is generally comprised of a primary processor 102, a job queue 104, a work item queue 106, a secondary processor 108, and a data storage medium 110. Data processing system 100 is further comprised of a messaging module (not show in Figure). In an embodiment, data processing system 100 includes at least one primary processor 102 and at least one secondary processor 108. For example, data processing system 100 may include one primary processor 102 and twenty secondary processors 108, wherein each processor includes multiple processing cores. In an embodiment, data processing system 100 may be provided utilizing common off-the-shelf hardware.

The messaging module of data processing system 100 may be any means for communication between the components of data processing system 100. For example, the messaging module may be a Java Messaging Service (JMS) Application, Programming Interface (API) utilized over a gigabit Ethernet. In an embodiment of the present disclosure, the message module is Apache ActiveMQ. In another embodiment, the messaging module utilizes TCP/IP sockets and MPI or PVM messaging libraries. Enterprise messaging systems, which provide additional facilities such as persistent messaging and message queues, may also be adapted as the messaging module. The message processing module further utilizes a messaging processing module to process status messages.

In an embodiment of the present disclosure, data processing system 100 implements a parallel processing architecture in which a large collection of data requires processing and each set of data contains an unpredictable amount of processing requirements. In this architecture, primary processor 102 receives a list of data from data storage medium 110. Data storage medium 110 may be, for example, at least one hard disk drive, an optical disc, flash memory, or a zip disk. Primary processor 102 stores the list of data in local memory utilizing job queue 104 and work item queue 106. In an embodiment, a separate data storage medium, such as a disk-based storage drive, may be used if the entries of work item queue 106 are too large to store in the local memory.

Primary processor 102 creates work items (not shown in Figure) based upon the list of data. A work item in data processing system 100 specifies an item of data that needs to be processed. For example, the item of data within a work item may be an exchange database file (EDB) file, a disk image file, an email message inside a Microsoft Outlook PST file, a Microsoft Word document, a zip file, an email message, and a Lotus Notes database file.

In an embodiment, a work item may be comprised of the physical location of the data stored in data storage medium 110, at least one data identifier to distinguish the location of embedded data associated to the data, and an identifier associated with the data. The identifier associated with the data may be a globally unique ID of the processing job that the work item is a member of. The physical location of the data may be represented by a root URL such as a file path to a PST file ("c:\evidence\input.pst"). The at least one data identifier may be an array of embedded IDs leading to the actual embedded data item inside the top-level data item. The actual values chosen for embedded IDs is implementation-dependent, but a simple implementation could be the embedded child ID based on position. For example, to describe a work item of the second attachment in the seventh email, inside the fourth folder, and inside a PST file, the at least one data identifier would be (assuming indexes start at 0): {"3", "6", "1" }.

Primary processor 102 monitors and tracks work items which needs to be processed by secondary processor 108. Each secondary processor 108 can ask primary processor 102 for a new work item to process whenever it is idle. In an embodiment, each secondary processor 108 executes four separate processes for requesting and processing work items. Once secondary processor 108 has finished processing a work item, secondary processor 108 may ask primary processor 102 for another work item. In another embodiment, primary processor 102 provides work items in a batch, for example, ten work items at once, to each secondary processor 108 to remove messaging latency. Since each secondary processor 108 controls work allocation explicitly, this architecture automatically provides load-balancing.

For the purposes of load-balancing, it is inefficient for secondary processor 108 to process an entire exchangeable database file, while another secondary processor 108 processes a single electronic file. In an embodiment, secondary processor 108 includes a data processor (not shown in Figure) to determine characteristics of embedded data within a work item. The data processor may process the work item based upon the type of embedded data, such as an exchangeable database file, a Microsoft Outlook email file, a Lotus Notes database file, a mailbox message file, an Outlook Express mail file, an Encase disk image file, raw disk image files, and partitions within a disk image. The data processor may also, for example, utilize the following classifications to determine the appropriate means to process embedded data:

INLINE: indicates a relatively simple embedded data (for example a word processing document) that should be processed immediately without any additional communication to primary processor 102.

WORK_ITEM: indicates that the embedded data is sufficiently complex that it should be processed by another secondary processor 108. The embedded data is sent to primary processor 102 to provide to another secondary processor 108 to process this embedded data.

PROCESSING_JOB: indicates that it is very complex data which primary processor 102 needs to handle as a separate processing job.

As secondary processor 108 processes a data item, which may contain embedded data therein, secondary processor 108 may send a status message to primary processor 102 to indicate that the embedded data should be processed by another secondary processor 108. Upon processing each job and work item within job queue 104 and work item queue 106, primary processor 102 may signal each secondary processor 108 and any intermediate results created by each secondary processor 108 can be passed to primary processor 102 for final aggregation.

Data processing system 100 may include a fault tolerance mechanism (not shown in Figure). A fault tolerance mechanism may be provided on primary processor 102 and each secondary processor 108 to ensure that an entire process does not need to be restarted from the beginning in the event of a software or hardware failure.

In an embodiment, a failure tolerance mechanism is provided on at least one secondary processor 108. If secondary processor 108 has a software or hardware failure, a fault tolerance mechanism can allow secondary processor 108 to restart its processes and continue to receive status messages from primary processor 102. The fault tolerance mechanism may be implemented to allow the messaging module to recognize when secondary processor 108 has restarted, and if necessary, re-deliver any outstanding status messages to secondary processor 108 (or re-route them to other secondary processors 108).

A fault tolerance mechanism may also be provided on primary processor 102. If primary processor 102 has a software or hardware failure, a fault tolerance mechanism can allow primary processor 102 to restart its processes and continue to provide status messages to secondary processor 108. In an embodiment, each secondary processor 108 is restarted upon the failure of primary processor 102, and the pending work items in work item queue 106 are serialized to ensure that remaining jobs in job queue 104 are processed upon restarting primary processor 102.

Figure 2:
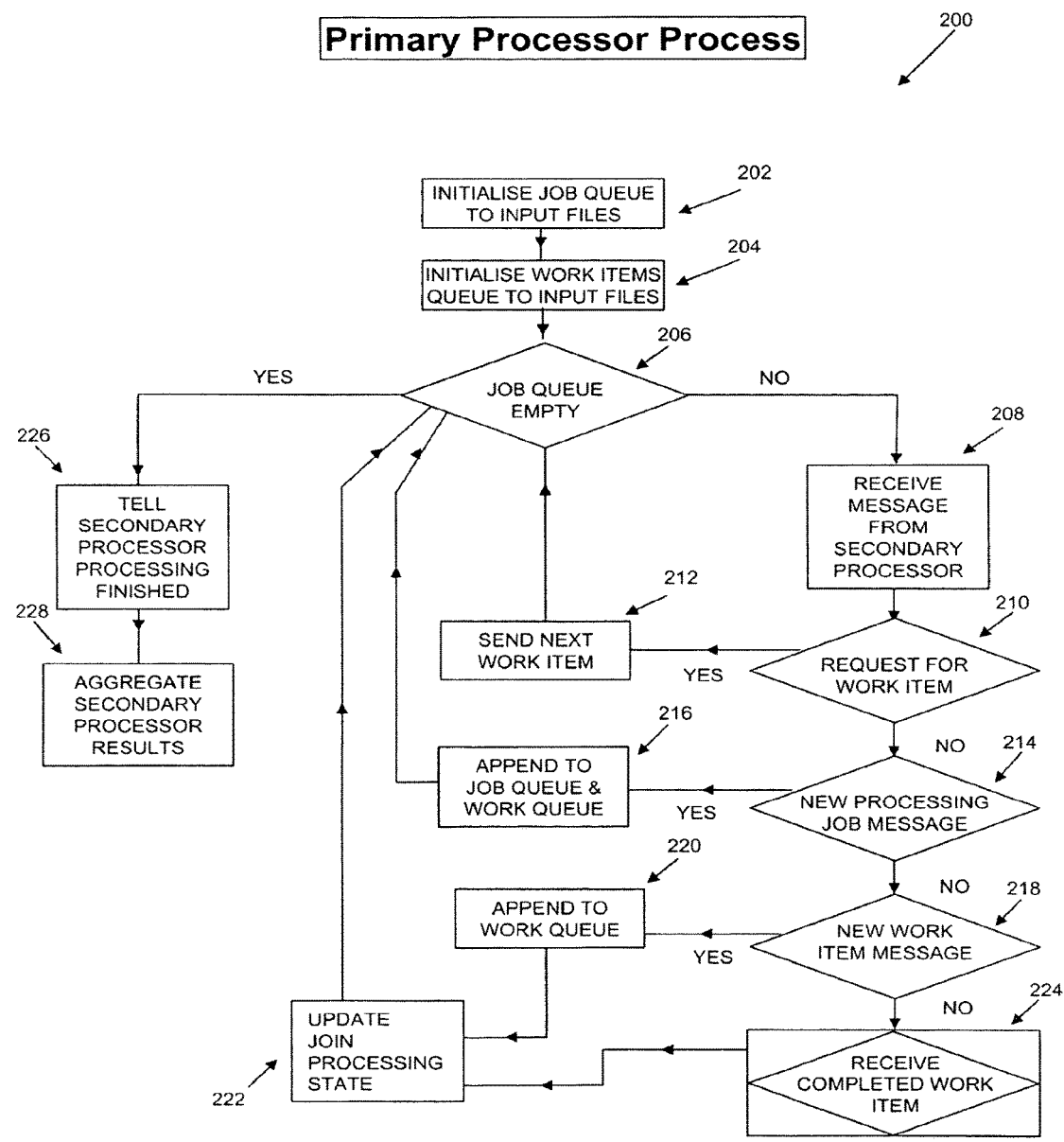
FIG. 2 is a functional block diagram of a method performed by a primary processor for parallelizing document indexing, according to the present disclosure.

Referring to FIG. 2, a functional block diagram of a method 200 performed by a primary processor for parallelizing document indexing is presented. Method 200 may include, but is not limited to the following steps, which are not limited to any particular order.

At step 202, primary processor 102 takes a list of data from data storage medium 110 as an input and initializes job queue 104. Primary processor 102 creates one entry within job queue 104 for each instance of data.

At step 204, primary processor 102 takes the list of data from data storage medium 110 and initializes work item queue 106. Primary processor 102 also creates one entry within work item queue 106 for each instance of data. Each entry within job queue 104 is initialized to indicate that it has one unprocessed work item associated with it.

At decision step 206, primary processor 102 determines whether job queue 104 is empty. If job queue 104 is empty, primary processor 102 continues to step 226. At step 226, primary processor 102 provides a status message to each secondary processor 108 to indicate that all processing jobs have been completed. At step 228, primary processor 102 aggregates the processing results of each secondary processor 108.

At step 208, primary processor 102 receives a status message from secondary processor 108. The status message provided by secondary processor 108 may be, but is not limited to, the following: a request for a work item, a request for another secondary processor 108 to process a work item, a request for primary processor 102 to create a new entry within job queue 104 and provide the new work item to another secondary processor 108, a processed work item, or a processed work item related to embedded data.

At decision step 210, primary processor 102 processes the status message to determine whether secondary processor 108 is requesting a new work item. If secondary processor 108 requests a new work item, primary processor 102 proceeds to step 212. At step 212, primary processor 102 takes the next work item in work item queue 106 and provides the work item to secondary processor 108. Primary processor 102 proceeds to step 206.

At decision step 214, primary processor 102 processes the status message to determine whether secondary processor 108 is requesting primary processor 102 to create a new entry within job queue 104 and provide the new work item to another secondary processor 108. If secondary processor 108 requests primary processor 102 to create a new entry within job queue 104, primary processor 102 proceeds to step 216. At step 216, primary processor 102 appends job queue 104 and work item queue 106 and creates new entries therein. Primary processor 102 proceeds to step 206.

At decision step 218, primary processor 102 processes the status message to determine whether secondary processor 108 is requesting another secondary processor 108 to process the work item. If secondary processor 108 is requesting another secondary processor 108 to process the work item, primary processor 102 proceeds to step 220. At step 220, primary processor 102 appends the work item to work item queue 106. At step 222, the entry within job queue 104, in which the appended work item is associated, is updated. In an embodiment, job queue 104 is incremented by one to represent that a work item remains unprocessed. The step of incrementing is performed to ensure that it is clear when a processing job has been completed. A processing job is completed when there are no longer any unprocessed work items associated with that processing job.

At step 224, primary processor 102 processes the status message to determine whether secondary processor 108 is providing a processed work item. If secondary processor 108 is providing a processed work item, primary processor 102 proceeds to step 222. In an embodiment, upon receiving a processed work item, primary processor 102 decrements work item queue 106 for the associated work item. If work item queue 106 is decremented to a value of zero, the associated entry within job queue 104 is removed from job queue 104.

Figure 3:
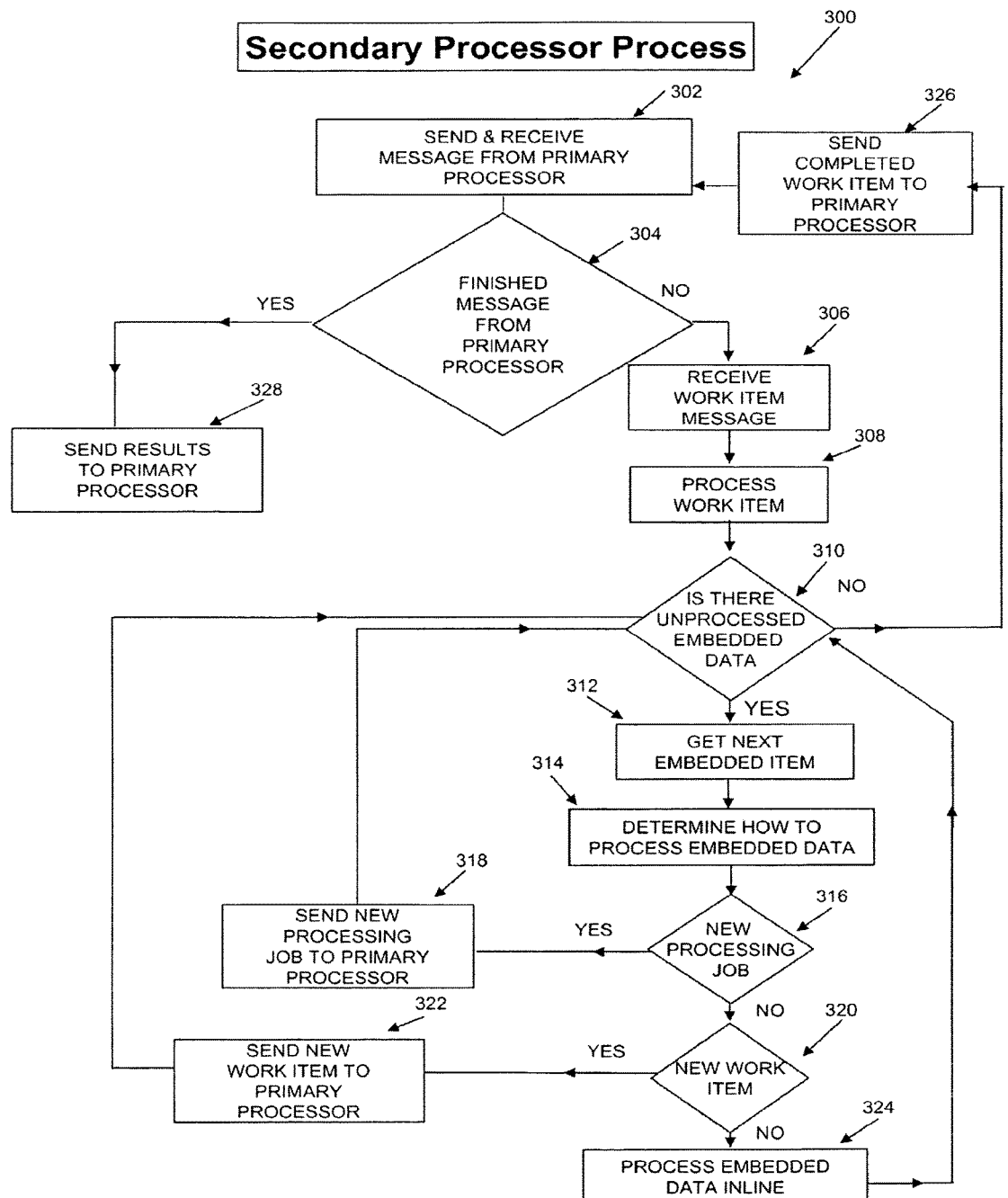
FIG. 3 is a functional block diagram of a method performed by at least one secondary processor for parallelizing document indexing, according to the present disclosure.

Referring to FIG. 3, a functional block diagram of a method performed by at least one secondary processor for parallelizing document indexing is presented. Method 300 may include, but is not limited to the following steps, which are not limited to any particular order.

At step 302, secondary processor 108 communicates with primary processor 102 via the messaging module. Secondary processor 108 sends a status message to primary processor 102 to request a work item if it has no active work items to process. Upon sending a message to primary processor 102, secondary processor 108 waits for a response status message from primary processor 102.

At decision step 304, secondary processor 108 receives a status message from primary processor 102. If primary processor 102 provides a status message to indicate that all processing jobs have been completed, secondary processor 108 proceeds to step 328. At step 328, secondary processor 108 transmits a status message, which includes the results of the processed work items, to primary processor 102. In an embodiment, the step of transmitting occurs via a remote-file system copy.

At step 306, secondary processor 108 receives and processes a status message relating to a work item from primary processor 102. At step 308, secondary processor 108 processes the work item as set forth in the status message. The actual work item described in the status message is interpreted by secondary processor 108 to ensure that it is clear which data needs to be processed. For example, the data could be email number 56 in an archive file.

At decision step 310, secondary processor 108 determines if the data of the work item contains embedded data. For example, embedded data may be an electronic mail which contain attachments, or a Microsoft PST folder which contains an email message. If secondary processor 108 determines that the work item contains embedded data, secondary processor 108 proceeds to step 312.

At step 312, secondary processor 108 processes the work item to extract the embedded data. At step 314, the data processor of secondary processor 108 determines a characteristic of the embedded data. Based upon the characteristic of the embedded data, secondary processor 108 determines the appropriates means to process the embedded data.

At decision step 316, the data processor determines whether the work item contains very complex data. At step 318, if the data processor determines that the work item is complex, secondary processor 108 will provide a status message to primary processor 102 to create a new entry within job queue 104 and provide the new work item to another secondary processor 108.

At decision step 320, the data processor determines whether the work item should be handled by another secondary processor 108. At step 322, if the data processor determines that the work item should be handled by another secondary processor 108, secondary processor 108 will send a status message, which includes the work item, to primary processor 102.

At step 324, secondary processor 108 processes the embedded data. At step 326, secondary processor 108 transmits a status message, which includes the completed work item and associated embedded data, to primary processor 102.

No element, act, or instruction used in the present application should be construed as critical or essential to the present disclosure unless explicitly described as such. In addition, as used herein, the article "a" is intended to include one or more items. Where only one item is intended, the term "one" or similar language is used.

It will be understood that various modifications may be made to the embodiments disclosed herein. Therefore, the above description should not be construed as limiting, but merely as exemplifications of the various embodiments of the present disclosure. Those skilled in the art will envision other modifications within the scope and spirit of the claims appended hereto.

What is claimed is:

1. A data processing system for parallelizing document indexing, the data processing system comprising:
   a storage medium;
   a primary processor coupled to the storage medium and operable to:
      receive a list of data, the data having embedded data associated therewith; and
      create one or more work items based upon the list of data; and
   at least two secondary processors to process the one or more work items as provided by the primary processor, wherein each of the secondary processors are configured to control work allocation of the one or more work items amongst one another and further perform load balancing by all operating simultaneously, wherein a first of the at least two secondary processors is operable to:
      request a new work item from the primary processor, determine one or more characteristics of embedded data in the requested new work item, and further determine, based on the one or more characteristics, that the embedded data in the requested new work item is to either be processed by the first secondary processor or be processed by a second secondary processor; and
      process the requested new work item or request the second secondary processor to process the requested new work item based on the determination of the one or more characteristics of the embedded data.

2. The data processing system of claim 1, wherein the primary processor is further comprised of a job queue, a work item queue, and a message processing module.

3. The data processing system of claim 2, wherein the job queue and the work item queue store the list of data.

4. The data processing system of claim 2, further comprising a messaging module configured to exchange at least one status message between the primary processor and one of the at least two secondary processors, wherein the message processing module processes the at least one status message.

5. The data processing system of claim 4, wherein the at least one status message includes any one or more of the following: a processed work item, a processed work item related to the embedded data, a result of the processed work items, a request for the work item, a new work item created by one of the at least two secondary processors, a request for another one of the at least two secondary processors to process the new work item, and a notification relating to the completion of processed work items.

6. The data processing system of claim 1, wherein the work item is comprised of the physical location of the data stored in a data storage medium, at least one data identifier to distinguish the location of the embedded data, and an identifier associated with the data.

7. The data processing system of claim 4, wherein at least one of the at least two secondary processors initiates the messaging module with the primary processor.

8. The data processing system of claim 4, wherein the message processing module appends the job queue or the work item queue based upon the at least one status message.

9. The data processing system of claim 4, wherein the message processing module aggregates results provided by the at least one secondary processor.

10. The data processing system of claim 1, further comprising a failure tolerance mechanism.

11. The data processing system of claim 1, wherein the data comprises an exchangeable database file.

12. The data processing system of claim 1, wherein the data comprises a disk image file.

13. The data processing system of claim 1, wherein the associated data comprises at least one electronic file.

* * * * *